US012809898B2

(12) United States Patent
Inomata et al.

(10) Patent No.: US 12,809,898 B2
(45) Date of Patent: Nov. 24, 2026

(54) INFORMATION PROCESSING METHOD AND RECORDING MEDIUM

(71) Applicant: SCREEN Holdings Co., Ltd., Kyoto (JP)

(72) Inventors: Masaki Inomata, Kyoto (JP); Hideaki Hoshino, Kyoto (JP); Keiryu Shuu, Kyoto (JP); Yasunori Nakamura, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 0 days.

(21) Appl. No.: 19/207,740

(22) Filed: May 14, 2025

(65) Prior Publication Data

US 2025/0355911 A1 Nov. 20, 2025

(30) Foreign Application Priority Data

May 17, 2024 (JP) ................................ 2024-081276

(51) Int. Cl.
*G06F 16/00* (2019.01)
*G06F 16/334* (2025.01)
*G06F 40/137* (2020.01)

(52) U.S. Cl.
CPC .......... *G06F 16/334* (2019.01); *G06F 40/137* (2020.01)

(58) Field of Classification Search
CPC .. G06F 16/334; G06F 16/332; G06F 16/3344; G06F 16/31; G06F 16/3329; G06F 16/338
See application file for complete search history.

(56) References Cited

U.S. PATENT DOCUMENTS 9,367,608 B1 * 6/2016 Zhang ................ G06F 16/3329
2009/0055887 A1 * 2/2009 Brodie ................ G06F 21/6227 726/1

(Continued)

FOREIGN PATENT DOCUMENTS

CN 116957103 A 10/2023
TW 202227999 A 7/2022
WO 2021/152712 A1 8/2021

OTHER PUBLICATIONS

Office Action dated Feb. 3, 2026, issued in corresponding Taiwanese Patent Application No. 114110638 (non-English).

(Continued)

*Primary Examiner* — Noosha Arjomandi
(74) *Attorney, Agent, or Firm* — Rimon P.C.

(57) ABSTRACT

The invention provides a technique capable of effectively reducing leakage of confidential information that is caused when a text generation model outputs text including the confidential information. The information processing method includes a) acquiring input text, b) acquiring an abstracted similar document based on a document registered in a document database, the abstracted similar document being similar to the input text and including confidential information abstracted by abstraction processing, and c) acquiring output text by using a text generation model, the output text being answer text for the input text when the input text and the abstracted similar document have been input, the text generation model being trained to generate answer text based on text and external information associated with the text.

8 Claims, 8 Drawing Sheets

(56) References Cited

U.S. PATENT DOCUMENTS

| | | | | |
|---|---|---|---|---|
| 2011/0113049 | A1 | 5/2011 | Davis et al. | |
| 2015/0100565 | A1 | 4/2015 | Clark et al. | |
| 2016/0283473 | A1* | 9/2016 | Heinze | G06F 16/22 |
| 2021/0149441 | A1 | 5/2021 | Bartscherer et al. | |
| 2022/0261494 | A1 | 8/2022 | Truong et al. | |
| 2023/0137378 | A1 | 5/2023 | Laterza et al. | |
| 2023/0351091 | A1 | 11/2023 | Gil et al. | |
| 2024/0346256 | A1* | 10/2024 | Qin | G06F 40/35 |
| 2024/0354436 | A1* | 10/2024 | Mukherjee | G06F 21/6227 |
| 2024/0370479 | A1* | 11/2024 | Hudetz | G06F 16/316 |
| 2025/0086310 | A1* | 3/2025 | Cuomo | G06F 16/3335 |
| 2025/0124055 | A1* | 4/2025 | Ruan | G06F 16/2477 |
| 2025/0156955 | A1* | 5/2025 | Ramaswamy | G06N 20/00 |
| 2025/0322158 | A1* | 10/2025 | Townsend-Last | G06F 16/3329 |
| 2025/0355911 | A1* | 11/2025 | Inomata | G06F 16/334 |
| 2026/0035915 | A1* | 2/2026 | Bakhash | E04C 2/521 |

OTHER PUBLICATIONS

Galitsky, B. "LLM-Based Personalized Recommendations in Health," Preprints.org, doi:10.20944/preprints 202402.1709.v1. (Feb. 29, 2024).

Office Action dated Apr. 28, 2026, issued in corresponding Korean Patent Application No. 10-2025-0046889.

Patrick Lewis, et al. "Retrieval-Augmented Generation for Knowledge-Intensive NLP Tasks," NeurIPS, Apr. 12, 2021.

Office Action dated Sep. 1, 2026 in corresponding Taiwanese Patent Application No. 114110638, with English Translation of Search Report.

* cited by examiner

INFORMATION PROCESSING METHOD AND RECORDING MEDIUM

RELATED APPLICATIONS

This application claims the benefit of Japanese Application No. 2024-081276, filed on May 17, 2024, the disclosure of which is incorporated by reference herein.

BACKGROUND OF THE INVENTION

Field of the Invention

The subject matter disclosed in the specification of the present application relates to an information processing method and a recording medium.

Description of the Background Art

Conventionally, there is known a document creation assistance device that causes a machine learning model to output a document (e.g., WO/2021/152712). The document creation assistance device extracts a document similar to a user input document (description of the invention) from among documents (patent documents) stored in a database and uses the extracted similar document to create a description of the invention that rephrases the user input document.

SUMMARY OF THE INVENTION

Technical Problem

In the case where a document stored in the database includes confidential information, output text generated by a document generator may include the confidential information. Thus, there is a risk of the confidential information being leaked if the output text including the confidential information is viewed by a user who should not have access to the confidential information.

It is an object of the present disclosure to provide a technique capable of effectively reducing leakage of confidential information when a text generation model outputs a document including the confidential information.

Solution to Problem

In order to solve the problems described above, a first aspect is an information processing method that is executed by a computer. The information processing method includes a) acquiring input text, b) acquiring an abstracted similar document based on a document registered in a document database, the abstracted similar document being similar to the input text and including confidential information abstracted by abstraction processing, and c) acquiring output text by using a text generation model, the output text being answer text for the input text when the input text and the abstracted similar document have been input, the text generation model being trained to generate answer text based on text and external information associated with the text.

A second aspect is the information processing method according to the first aspect, in which the operation b) includes b11) acquiring a similar document by searching the document database for a document similar to the input text, and b12) generating the abstracted similar document by abstracting the confidential information included in the similar document.

A third aspect is the information processing method according to the second aspect, in which the operation b11) includes generating abstracted input text by abstracting a word included in the input text, and acquiring the similar document by searching the document database for a document similar to the abstracted input text.

A fourth aspect is the information processing method according to any one of the first to third aspects, in which the operation b) includes b21) abstracting confidential information included in each of a plurality of documents registered in the document database, and b22) acquiring the abstracted similar document by retrieving a document similar to the input text from among abstracted documents abstracted in the operation b21).

A fifth aspect is the information processing method according to the fourth aspect, in which the operation c) includes inputting a document retrieved from among the abstracted documents in the operation b22) as the abstracted similar document to the text generation model.

A sixth aspect is the information processing method according to any one of the first to fifth aspects that further includes d) generating abstracted output text by abstracting confidential information included in the output text acquired in the operation c).

A seventh aspect is the information processing method according to any one of the first to sixth aspects, in which the abstraction processing in the operation b) includes processing for, by using ontology information that defines a hierarchical relationship of a plurality of concepts, abstracting the confidential information to a concept corresponding to a conceptual hierarchy level set in advance.

An eighth aspect is a recording medium having records thereon a computer-readable computer program, the computer program causing the computer to execute the information processing method according to any one of the first to seventh aspects.

Advantageous Effects of Invention

According to the first to eighth aspects, even if a document stored in the document database includes confidential information, an abstracted document is input to the text generation model. This reduces the probability that output text including the confidential information will be output.

With the information processing method according to the third aspect, a similar document is searched for by using the abstracted input text obtained by abstracting the input text. Therefore, it is possible to broadly search for a document similar to the input text without being tied to a specific word.

With the information processing method according to the fourth aspect, a document similar to the input text is retrieved from among the abstracted documents. Therefore, it is possible to broadly search for a document similar to the input text without being tied to a specific word.

With the information processing method according to the fifth aspect, the output text can be acquired speedily by inputting the document retrieved from among the abstracted documents as an abstracted similar document to the text generation model.

With the information processing method according to the sixth aspect, leakage of the confidential information can be further reduced by abstracting the output text.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are described hereinafter with reference to the accompanying drawings. Constituent elements described in the embodiments are merely illustrative examples, and the scope of the present invention is not intended to be limited by them. To facilitate understanding of the drawings, the dimensions or number of each constituent element may be illustrated in exaggerated or simplified form as necessary.

1. First Embodiment

Figure 1:
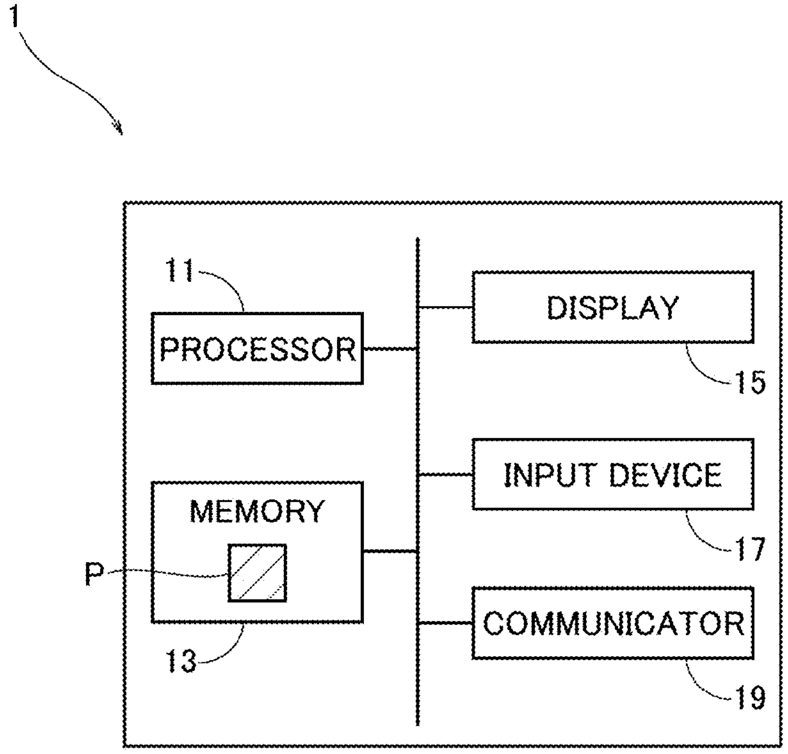
FIG. 1 is a diagram showing a configuration of an information processing apparatus according to a first embodiment.

FIG. 1 is a diagram showing a configuration of an information processing apparatus 1 according to a first embodiment. The information processing apparatus 1 is a computer that includes a processor 11 and memory 13. The processor 11 may include, for example, a central processing unit (CPU). The memory 13 may include, for example, read-only memory (ROM) or random-access memory (RAM). Note that the memory 13 may include auxiliary memory such as a hard disk drive (HDD) or a solid-state drive (SSD). The memory 13 is connected to the processor 11 via a system bus.

The memory 13 stores a computer program P. The computer program P is executable by the processor 11 of the information processing apparatus 1. When the processor 11 executes the computer program P, information processing described later is executed in the information processing apparatus 1. The computer program P may be recorded on a non-transitory recording medium. The recording medium may, for example, an optical medium or semiconductor memory such as USB memory. The computer program P recorded on the recording medium is readable by a reading device not shown. Note that the computer program P may be stored in the memory 13 via a network line not shown.

The information processing apparatus 1 further includes a display 15 and an input device 17. The display 15 and the input device 17 are connected to the processor via the system bus. The display 15 is a device that visually displays outputs of the information processing apparatus 1, and is specifically a liquid crystal display. The input device 17 is a device that enables a user to input data or instructions to the information processing apparatus 1, and is specifically a keyboard, a mouse, or the like. Note that the display 15 may be allowed to function as the input device by including, for example, a touch panel.

The information processing apparatus 1 further includes a communicator 19. The communicator 19 is configured by a network adapter or the like. Using a wired or wireless communication protocol, the communicator 19 transmits and receives various types of data to and from an external device such as a server via a network not shown. The communicator 19 is connected to the processor 11 via the system bus.

Figure 2:
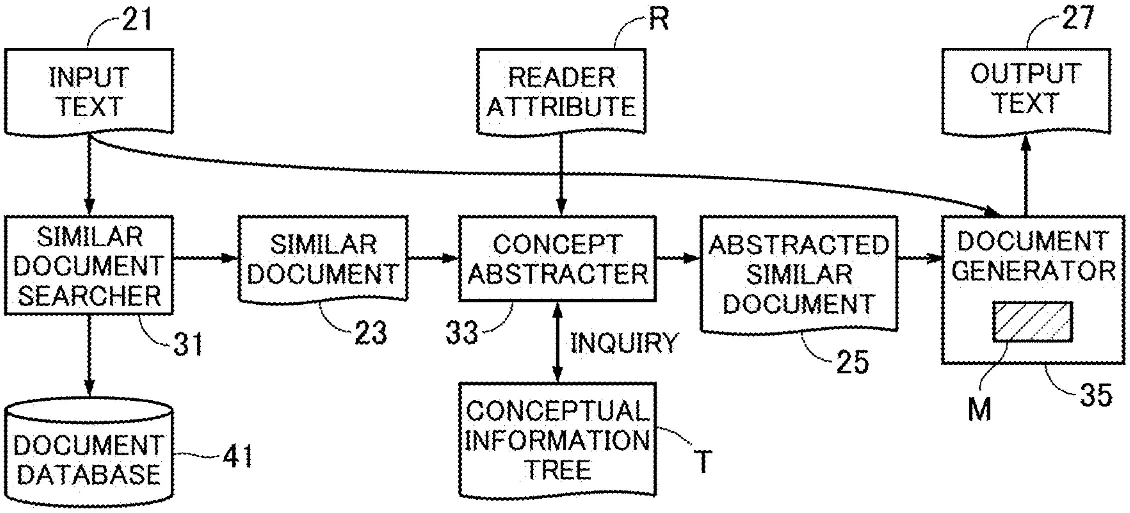
FIG. 2 is a block diagram schematically showing a procedure of information processing according to the first embodiment.

FIG. 2 is a block diagram schematically showing a procedure of information processing according to the first embodiment. A similar document searcher 31, a concept abstractor 33, and a document generator 35 shown in FIG. 2 are functional blocks realized by the processor 11 executing the computer program P. As will be described below, the information processing apparatus 1 is configured to interactively generate output text 27 from input text 21 by using a technique called retrieval augmented generation (RAG).

First, the similar document searcher 31 accepts input of text (question text) from a user. The user inputs the text via the input device 17. Then, the similar document searcher 31 searches a document database 41 having a plurality of documents registered therein for a document similar to the input text 21 that has been input. By this search processing, one or more similar documents 23 are acquired. Note that the document database 41 may be included in the information processing apparatus 1, or may be realized by an external device such as a server capable of communication with the information processing apparatus 1.

The concept abstractor 33 abstracts confidential information (words) that is included in a similar document 23 but is to be concealed, by using a conceptual information tree T. The conceptual information tree T is ontology information that includes a plurality of concepts and defines a hierarchical relationship of the concepts.

Figure 3:
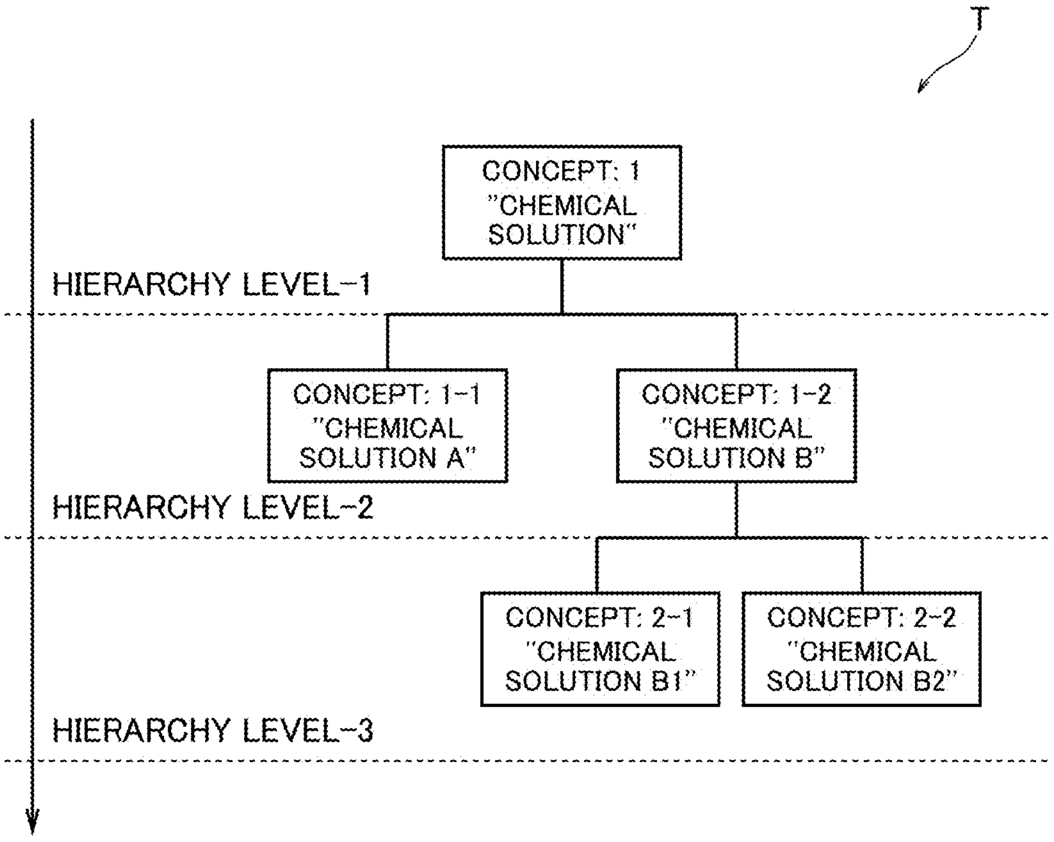
FIG. 3 is a diagram showing a conceptual information tree.

FIG. 3 is a diagram showing the conceptual information tree T. The conceptual information tree T is configured by a plurality of concepts, and a word serving as a specific expression such as "chemical solution," "chemical solution A," "chemical solution B," "chemical solution B1," or "chemical solution B2" is assigned to each concept. Note that the expression such as "chemical solution A" in FIG. 3 is merely used for the sake of convenience, and in actuality a specific name (e.g., a name including a chemical solution name and chemical properties (acid or basic)) is assigned to each concept.

In the conceptual information tree T, a hierarchical relationship is described in a tree structure. For example, when viewed from "chemical solution B," "chemical solution" is a one-level-higher concept connected by a link. When viewed from "chemical solution B," "chemical solution B1" and "chemical solution B2" are one-level-lower concepts each connected by a link.

As shown in FIG. 3, the conceptual information tree T defines a conceptual hierarchy level for each concept. The conceptual hierarchy level is information indicating the depth of the concept from a reference concept (here, the highest-level route concept). In the conceptual information tree T shown in FIG. 3, the hierarchy level of the route concept is defined as "hierarchy level-1," and each time the depths of the conceptual hierarchy levels increase by one, numerals indicating the hierarchy levels increase by one, such as "hierarchy level-2," "hierarchy level-3," and so on.

The conceptual information tree T in FIG. 3 shows a tree structure for one route concept. However, the conceptual information tree T may include a plurality of types of route concepts and may include a tree structure for each route concept.

The conceptual information tree T is prepared in advance by a user or the like and stored together with the computer program P in the memory 13. Alternatively, the conceptual information tree T may be stored in an external device such as a server capable of communication with the information processing apparatus 1.

Referring back to FIG. 2, the concept abstractor 33 acquires a reader attribute R and abstracts confidential information included in a similar document 23 depending on the acquired reader attribute R. By this abstraction processing performed by the concept abstractor 33, an abstracted similar document 25 is generated. The reader attribute R is information indicating the attribute of the user who is a reader, and is also information indicating the conceptual hierarchy level that the user is permitted to view. The reader attribute R corresponds to the hierarchy level defined in the conceptual information tree T. That is, for example, in the case where the reader attribute R is "hierarchy level-2," the reader is permitted to view concepts at "hierarchy level-2" and concepts at higher hierarchy levels than "hierarchy level-2" (i.e., concepts at "hierarchy level-1") included in the conceptual information tree T, and is prohibited from viewing concepts at lower hierarchy levels than "hierarchy level-2" (i.e., concepts at "hierarchy level-3").

The reader attribute R of each user may be managed in, for example, a user database not shown. Then, the concept abstractor 33 may perform predetermined user authentication and acquire the reader attribute R of a user whose authentication has succeeded, from the user database.

In the abstraction processing, the concept abstractor 33 analyzes a similar document 23 to be processed, so as to divide the document into words. Then, the concept abstractor 33 queries the conceptual information tree T to find words included in the analyzed similar document 23 and identifies words that are included in the similar document 23 but prohibited from being viewed by the user (reader). To be more specific, the concept abstractor 33 determines, for each word, whether the word corresponds to any of the concepts registered in the conceptual information tree T. Then, when the conceptual information tree T has the word registered therein, the concept abstractor 33 acquires the hierarchy level of the word. If the acquired hierarchy level is lower than the reader attribute R, the concept abstractor 33 identifies the word as a word prohibited from being viewed. After having identified the word prohibited from being viewed, the concept abstractor 33 abstracts the word to a word at a conceptual hierarchy level that the reader is permitted to view (superordinate conceptualization).

For example, in the case where the reader attribute R is "hierarchy level-2" and the similar document 23 includes "chemical solution B1" that is a word at "hierarchy level-3," "chemical solution B1" is identified as a word prohibited from being viewed. Then, the concept abstractor 33 replaces this word with "chemical solution B" that is a word at "hierarchy level-2" that the reader is permitted to view. In this way, the abstracted similar document 25 is generated by abstracting the confidential information depending on the reader attribute R of the user. In the case where there are a plurality of similar documents 23, the abstracted similar document 25 is generated for each similar document 23.

The document generator 35 uses a text generation model M to acquire output text 27 based on the input text 21 and the abstracted similar document 25. The text generation model M is a trained model that is trained to generate answer text for input text based on the input text and external information associated with the input text. The text generation model M is specifically a large language model (LLM). LLM may, for example, be a deep neural network based on a self-attention mechanism called Transformer. Transformer is capable of capturing the relationship of an input sequence as a whole by the self-attention mechanism.

The abstracted similar document 25 is a document similar to the input text 21. That is, the abstracted similar document 25 corresponds to the external information associated with the input text 21. By inputting the input text 21 and the abstracted similar document 25 to the text generation model M, the document generator 35 acquires the output text 27 serving as answer text to the input text 21. The information processing apparatus 1 displays the acquired output text 27 on the display 15. This enables the user to view the output text 27.

Note that the generation of the output text 27 using the text generation model M may be realized by an external device such as a server capable of communication with the information processing apparatus 1. In this case, the information processing apparatus 1 may transmit the input text 21 and the abstracted similar document 25 to the external device. Then, the information processing apparatus 1 may receive the output text 27 generated by the external device to acquire the output text 27.

As described above, the information processing apparatus 1 retrieves a similar document 23 similar to the input text 21 from the document database 41 and acquires the output text 27 serving as answer text by using the text generation model M that uses the input text 21 and the abstracted similar document 25 based on the retrieved similar document 23.

In the information processing apparatus 1, even if the similar document 23 includes confidential information, the abstracted similar document 25 obtained by abstracting the confidential information is input to the text generation model M. This considerably reduces the probability that text including the confidential information will be output from the text generation model M. Accordingly, it is possible to effectively reduce leakage of the confidential information.

2. Second Embodiment

Next, a second embodiment is described. In the following description, elements that are identical in function to already-described elements are given the same reference signs or reference signs with additional alphabetic characters, and detailed descriptions thereof may be omitted.

Figure 4:
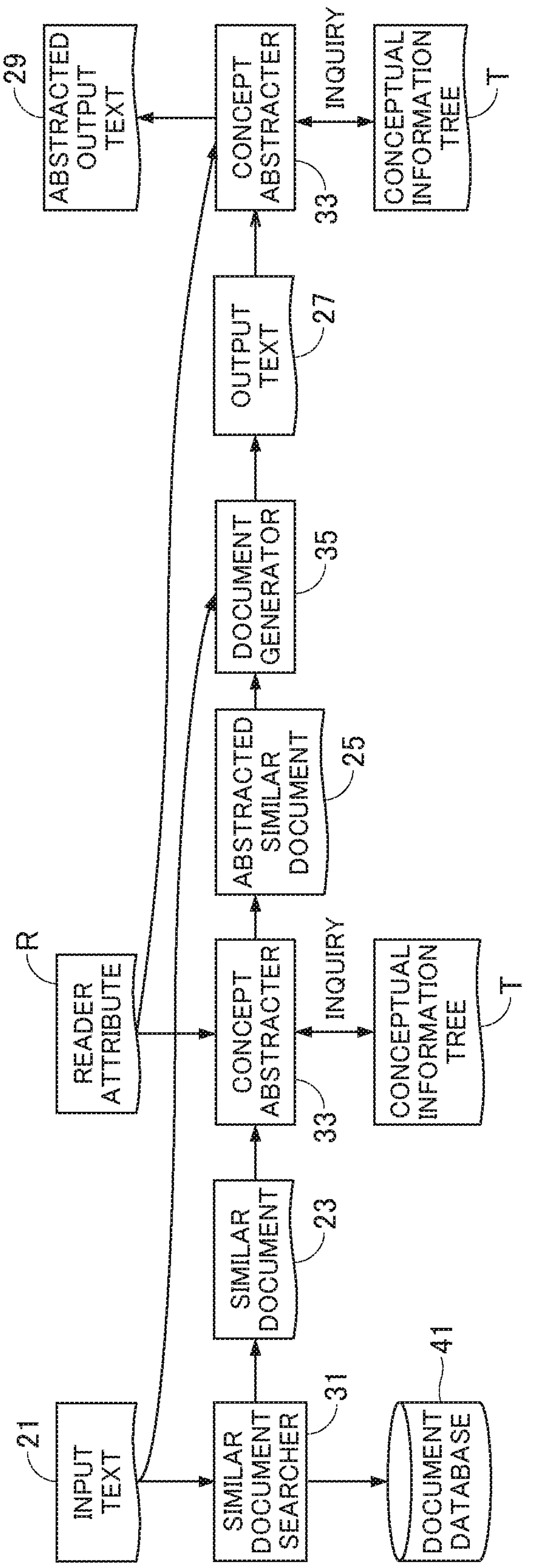
FIG. 4 is a block diagram schematically showing a procedure of information processing according to a second embodiment.

FIG. 4 is a block diagram schematically showing a procedure of information processing according to the second embodiment. In the information processing according to the second embodiment, the output text 27 is also acquired by the same processing as the information processing described in the first embodiment with reference to FIG. 2. Then, the concept abstractor 33 executes processing for abstracting confidential information included in the output text 27 based on the reader attribute R and the conceptual information tree T. This abstraction processing is the same as the processing performed by the concept abstractor 33 to abstract the input text 21, and therefore a detailed description thereof is omitted. In the case where the output text 27 includes a word included in the confidential information prohibited from being viewed by the reader attribute R, abstracted output text 29 that includes abstracted confidential information is generated by the abstraction processing performed by the concept abstractor 33. The information processing apparatus 1 displays the generated abstracted output text 29 on the display 15. This enables the user to view the abstracted output text 29.

Through the information processing according to the second embodiment, even if the text generation model M outputs the output text 27 that includes confidential information prohibited from being viewed by the user, the confidential information is abstracted by the abstraction processing. This further reduces leakage of the confidential information.

3. Third Embodiment

Figure 5:
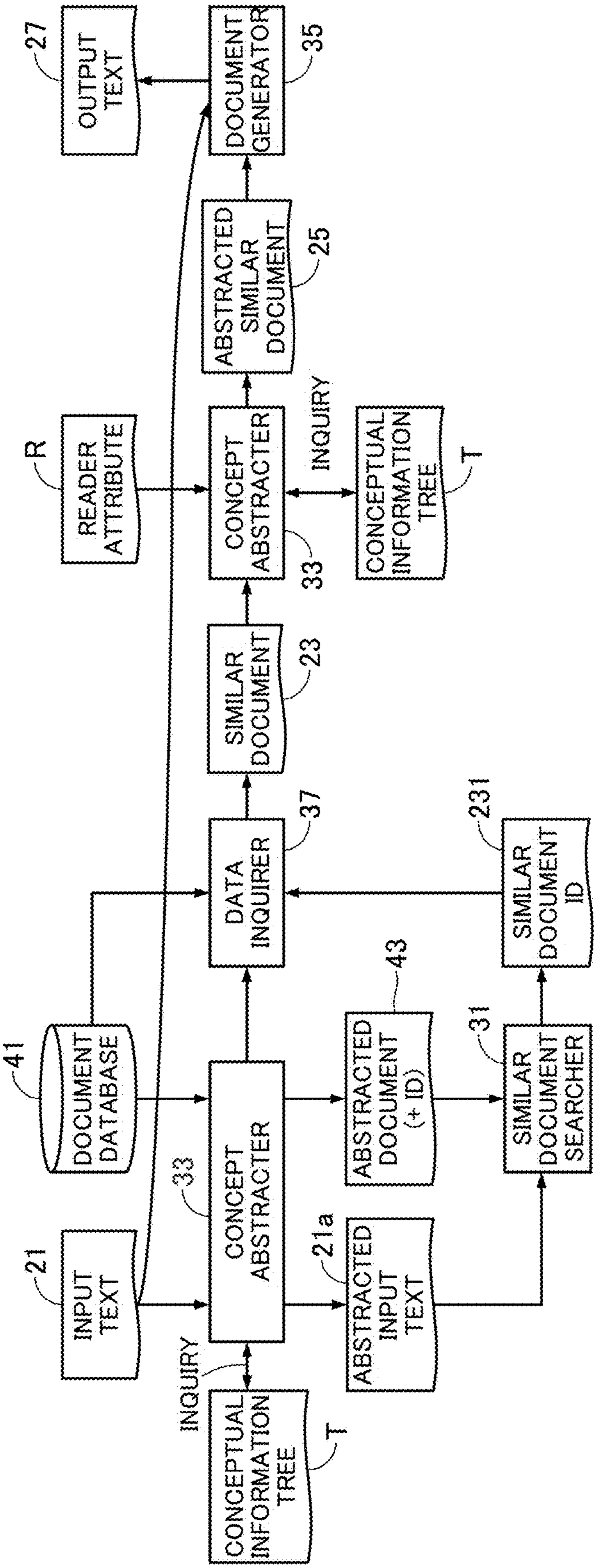
FIG. 5 is a block diagram showing a procedure of information processing according to a third embodiment.

FIG. 5 is a block diagram showing a procedure of information processing according to a third embodiment. In the information processing according to the third embodiment, before searching the document database 41 for a document similar to the input text 21, the concept abstractor 33 abstracts the input text 21 and documents registered in the document database 41. Then, the similar document searcher 31 searches for a similar document 23 similar to the input text 21 by using the abstracted input text 21 (abstracted input text 21*a*) and abstracted documents (abstracted documents 43). Note that a data inquirer 37 shown in FIG. 5 is a function realized by the processor 11 executing the computer program P. The function of the data inquirer 37 will be described later.

Figure 6A:
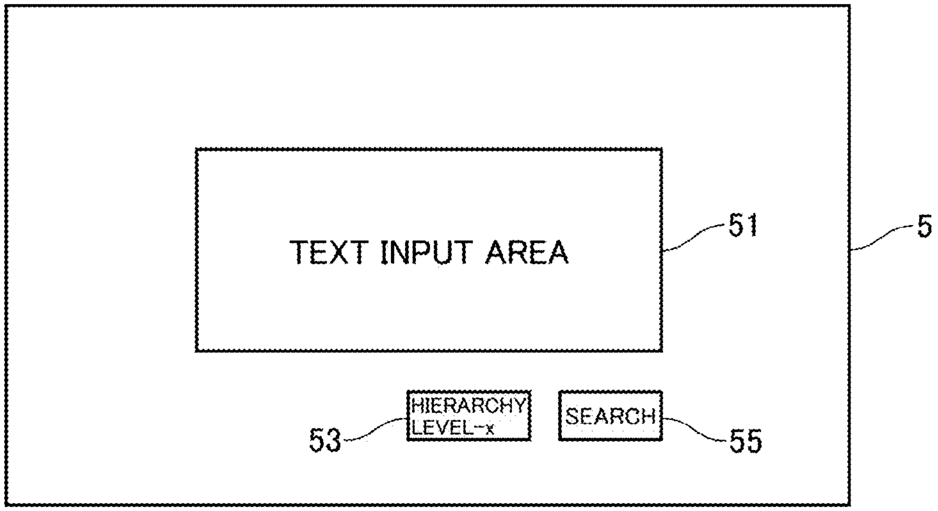
FIGS. 6A and 6B are diagrams showing a GUI window for abstracting input text.
Figure 6B:
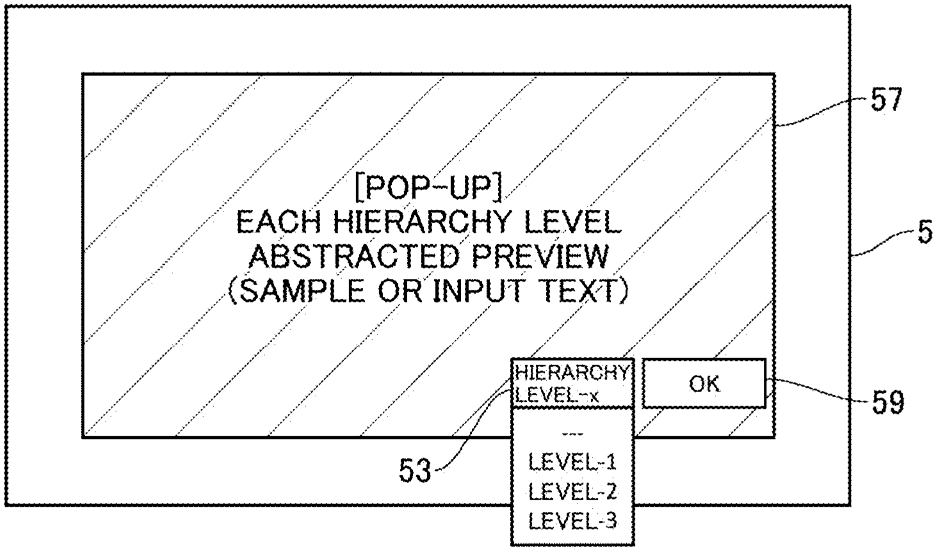

FIGS. 6A and 6B are diagrams showing a GUI window 5 for abstracting the input text 21. FIG. 6A shows an initial state of the GUI window 5. FIG. 6B shows the GUI window 5 that has transitioned to a pop-up state from the initial state. First, the GUI window 5 in the initial state includes an input area 51, a hierarchy-level designator 53, and a search button 55 as shown in FIG. 6A.

The input area 51 defines an area that allows the user to input target input text 21. When the user has inputted text while selecting the input area 51, the input text is displayed in the input area 51.

The user who has inputted the input text 21 operates the hierarchy-level designator 53 to designate a hierarchy level for abstraction. For example, hierarchy levels may be displayed in a pull-down menu for selection. The hierarchy level selected by the hierarchy-level designator 53 corresponds to the hierarchy level defined in the conceptual information tree T (hierarchy level-1, hierarchy level-2, and so on).

When the user has pressed the hierarchy-level designator 53 in the GUI window 5 in the initial state, the GUI window 5 transitions to the pop-up state shown in FIG. 6B. The GUI window 5 in the pop-up state displays a pull-down menu of the hierarchy-level designator 53 and a preview area 57. Then, when the user has selected a specific hierarchy level from the pull-down menu of the hierarchy-level designator 53, the abstracted input text 21*a* that includes the input text 21 abstracted to the selected hierarchy level is displayed in the preview area 57.

When abstracting the input text 21, the concept abstractor 33 first queries the conceptual information tree T to find words included in the input text 21 and identifies words that are at lower hierarchy levels than the designated hierarchy level. Then, the concept abstractor 33 replaces each identified word with a word at the designated hierarchy level. In this way, the abstracted input text 21*a*, in which the input text 21 is abstracted to the concept level corresponding to the designated hierarchy level, is generated and displayed in the preview area 57. In the case where the hierarchy-level designator 53 is pressed before input of the input text 21, sample text prepared in advance may be displayed in the preview area 57.

The GUI window 5 in the pop-up state displays a set button 59. When the user has pressed the set button 59, the GUI window 5 transitions to the initial state shown in FIG. 6A. When the search button 55 is pressed after the input text 21 has been input and the hierarchy level has been selected, the input text 21 and the hierarchy level are confirmed. Then, a search for a similar document is conducted using the document database 41.

Figure 7:
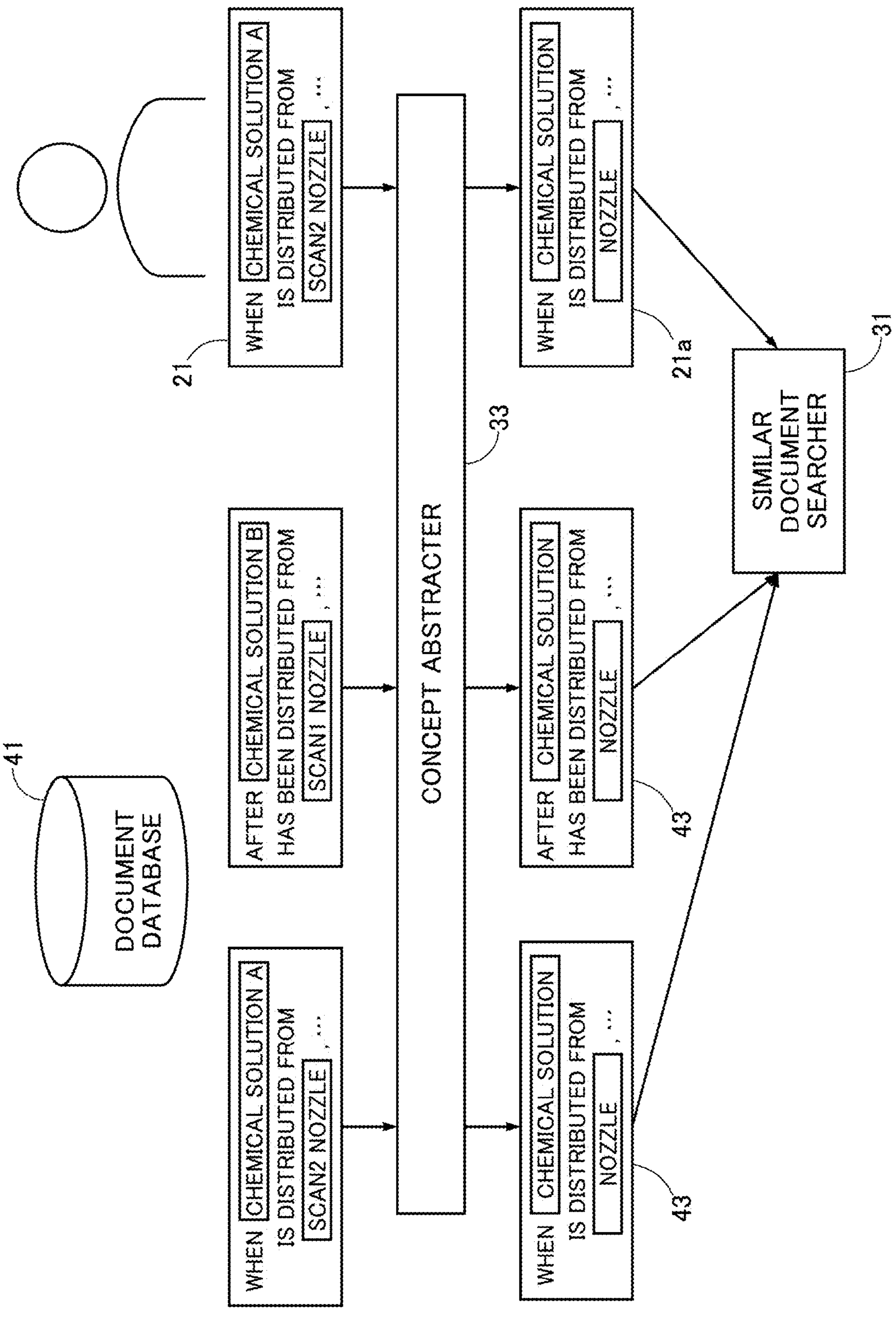
FIG. 7 is a diagram conceptually showing data that is used in a search conducted by a similar document searcher in the information processing according to the third embodiment.

FIG. 7 is a diagram conceptually showing data that is used in a search conducted by the similar document searcher 31 in the information processing according to the third embodiment. When the hierarchy level has been confirmed by the operation made on the GUI window 5, the concept abstractor 33 generates a plurality of abstracted documents 43 by performing processing for abstracting each document stored in the document database 41 to the confirmed hierarchy level. This abstraction processing is the same as the processing for abstracting the input text 21. The concept abstractor 33 further assigns ID information for identifying the original document to each of the generated abstracted documents 43. The ID information indicates a document ID assigned to each document in the document database 41. When the generation of the abstracted documents 43 is completed, the similar document searcher 31 retrieves a document similar to the abstracted input text 21*a* from among the abstracted documents 43.

Referring back to FIG. 5, in the case where the abstracted document 43 similar to the abstracted input text 21*a* has been found by the search, the similar document searcher 31 acquires a similar document ID 231 that is the ID information about the abstracted document 43. The similar document ID 231 is transferred to the data inquirer 37. In the case where a plurality of similar abstracted documents 43 have been found, the degree of similarly may be calculated for each similar abstracted document, and only the similar document ID 231 of the abstracted document 43 with the highest degree of similarity may be transferred to the data inquirer 37.

The document database 41 is queried for a similar document ID 231 with the highest degree of similarity so as to acquire a document corresponding to the similar document ID 231 as the similar document 23. Note that the processing performed until the output text 27 is acquired from the similar document 23 is the same as the processing described in the first embodiment, and therefore a description thereof is omitted.

As described above, in the information processing according to the third embodiment, a similar document is searched for by using the abstracted input text 21*a* and the abstracted document 43 obtained by abstraction. Therefore, it is possible to broadly acquire a similar document without being tied to a specific word.

Figure 8:
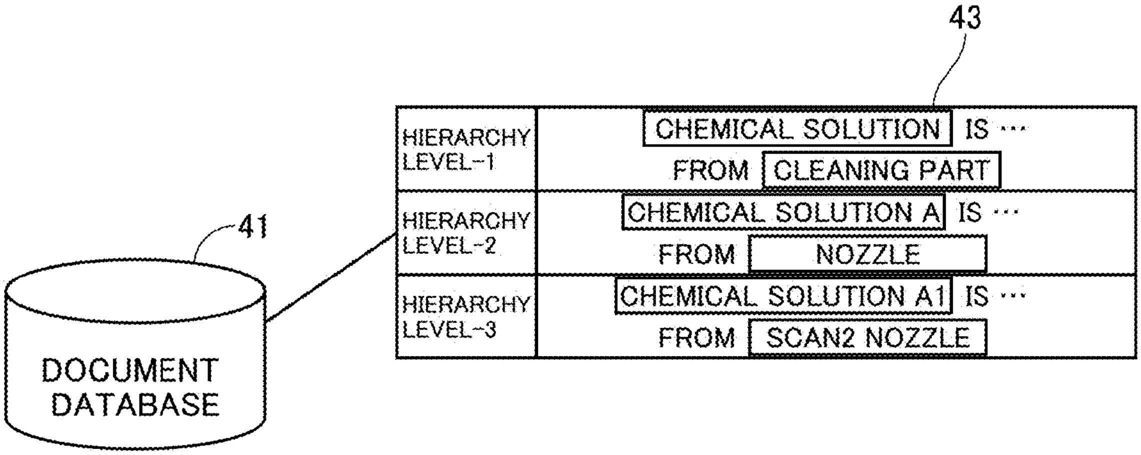
FIG. 8 is a diagram showing a document database having abstracted documents registered in advance.

Although, in the third embodiment, the concept abstractor 33 generates the abstracted document 43 at the designated hierarchy level from the document database 41, this is not essential. FIG. 8 is a diagram showing the document database 41 having the abstracted documents 43 registered in advance. As shown in FIG. 8, the abstracted document 43 at each hierarchy level and its original non-abstracted document may be stored in advance in the document database 41. In this way, once generating the abstracted documents 43 eliminates the need to again generate the abstracted documents 43 and thereby allows quick start of a search for a similar document.

In the third embodiment, once the original non-abstracted similar document 23 is acquired, then the concept abstractor 33 conducts abstraction depending on the reader attribute R to generate the abstracted similar document 25. Alternatively, the abstracted document 43 found by the similar document searcher 31 may be used as the abstracted similar document 25. In this case, the information processing is simplified because it is possible to eliminate the step of acquiring the non-abstracted similar document 23 by the inquiry made by the data inquirer 37 and the step of abstracting the similar document 23.

4. Variations

While the embodiments have been described thus far, the present invention is not intended to be limited to the examples described above, and may be modified in various ways.

For example, although in the above-described embodiments, the hierarchy levels are defined in the conceptual information tree T, this is not essential. For example, instead of the hierarchy level, a disclosure range that indicates a range permitted to be disclosed may be defined in the conceptual information tree T, and the reader attribute R may be used as information indicating whether the reader attribute is included in the disclosure range. In this case, the concept abstractor 33 may identify a word that does not include the reader attribute R in the disclosure range, and may abstract this word to a word that includes the reader attribute R in the disclosure range (superordinate conceptualization).

While the invention has been shown and described in detail, the foregoing description is in all aspects illustrative and not restrictive. It is therefore understood that numerous modifications and variations can be devised without departing from the scope of the invention.

What is claimed is:

1. An information processing method that is executed by a computer, the information processing method comprising:
- acquiring input text;
- searching a document database for a similar document that is similar to the input text;
- performing user authentication for a user and acquiring, from a user database, a reader attribute of the user whose authentication has succeeded, the reader attribute indicating a conceptual hierarchy level that the user is permitted to view;
- acquiring, from a memory or an external server, stored ontology information, the stored ontology information defining:
  - a plurality of concepts,
  - a word assigned to each concept,
  - a hierarchy level of each concept, and
  - a parent-child relationship among the plurality of concepts;
- generating an abstracted similar document from the similar document by:
  - dividing the similar document into words;
  - finding, from the words of the similar document, a word assigned to one of the plurality of concepts defined in the stored ontology information;
  - acquiring, from the stored ontology information, a hierarchy level of a concept to which the found word is assigned;
  - determining that the found word is prohibited from being viewed by the user when the hierarchy level of the concept to which the found word is assigned is lower than the conceptual hierarchy level indicated by the reader attribute;
  - selecting, from the stored ontology information, a replacement word assigned to a concept that is connected, by the parent-child relationship, to the concept to which the found word is assigned and that is at the conceptual hierarchy level indicated by the reader attribute; and
  - replacing the found word in the similar document with the replacement word; and
- acquiring output text by using a text generation model, the output text being answer text for the input text when the input text and the abstracted similar document have been input to the text generation model.

2. The information processing method according to claim 1, further comprising before searching the document database for the similar document, generating abstracted input text from the input text by:
- finding a word included in the input text and included in the stored ontology information;
- acquiring, from the stored ontology information, a hierarchy level of the word included in the input text;
- identifying the word included in the input text when the hierarchy level of the word included in the input text is lower than a designated hierarchy level; and
- replacing the identified word included in the input text with a word at the designated hierarchy level,
- wherein searching the document database for the similar document includes searching the document database by using the abstracted input text.

3. The information processing method according to claim 1, further comprising after acquiring the output text, generating abstracted output text from the output text by:
- dividing the output text into words;
- finding, from the words of the output text, an output word assigned to one of the plurality of concepts defined in the stored ontology information;
- acquiring, from the stored ontology information, a hierarchy level of a concept to which the output word is assigned;
- determining that the output word is prohibited from being viewed by the user when the hierarchy level of the concept to which the output word is assigned is lower than the conceptual hierarchy level indicated by the reader attribute;
- selecting, from the stored ontology information, a replacement output word assigned to a replacement concept that is connected, by the parent-child relationship, to the concept to which the output word is assigned and that has the conceptual hierarchy level indicated by the reader attribute;
- replacing the output word in the output text with the replacement output word; and
- displaying the abstracted output text on a display.

4. The information processing method according to claim 1, further comprising:
- displaying a GUI window including:
  - an input area for receiving the input text;
  - a hierarchy-level designator for receiving a designation of a designated hierarchy level; and
  - a search button for starting a search of the document database;
- receiving the input text in the input area;

receiving, through the hierarchy-level designator, the designation of the designated hierarchy level;

generating abstracted input text from the input text by:

dividing the input text into words;

finding, from the words of the input text, an input word assigned to one of the plurality of concepts defined in the stored ontology information;

acquiring, from the stored ontology information, a hierarchy level of a concept to which the input word is assigned;

determining that the input word is a replacement target when the hierarchy level of the concept to which the input word is assigned is lower than the designated hierarchy level;

selecting, from the stored ontology information, a replacement input word assigned to a concept that is connected, by the parent-child relationship, to the concept to which the input word is assigned and that is at the designated hierarchy level; and replacing the input word in the input text with the replacement input word; and searching the document database for the similar document by using the abstracted input text as search text based on the input text.

5. The information processing method according to claim 4, further comprising:

in response to an operation of the hierarchy-level designator, transitioning the GUI window from an initial state to a pop-up state;

displaying, in the pop-up state, a pull-down menu of the hierarchy-level designator and a preview area; and displaying the abstracted input text in the preview area when the designated hierarchy level is selected from the pull-down menu.

6. The information processing method according to claim 5, further comprising:

displaying a set button in the pop-up state;

in response to an operation of the set button, transitioning the GUI window from the pop-up state to the initial state; and confirming the input text and the designated hierarchy level in response to an operation of the search button after the input text has been received and the designated hierarchy level has been selected.

7. The information processing method according to claim 5, further comprising, when the hierarchy-level designator is operated before the input text is received in the input area, displaying sample text prepared in advance in the preview area.

8. A non-transitory tangible recording medium having recorded thereon a computer program, the computer program causing a computer to execute an information processing method comprising:

acquiring input text;

searching a document database for a similar document that is similar to the input text;

performing user authentication for a user and acquiring, from a user database, a reader attribute of the user whose authentication has succeeded, the reader attribute indicating a conceptual hierarchy level that the user is permitted to view;

acquiring, from a memory or an external server, stored ontology information, the stored ontology information defining:

a plurality of concepts, a word assigned to each concept, a hierarchy level of each concept, and a parent-child relationship among the plurality of concepts;

generating an abstracted similar document from the similar document by:

dividing the similar document into words;

finding, from the words of the similar document, a word assigned to one of the plurality of concepts defined in the stored ontology information;

acquiring, from the stored ontology information, a hierarchy level of a concept to which the found word is assigned;

determining that the found word is prohibited from being viewed by the user when the hierarchy level of the concept to which the found word is assigned is lower than the conceptual hierarchy level indicated by the reader attribute;

selecting, from the stored ontology information, a replacement word assigned to a concept that is connected, by the parent-child relationship, to the concept to which the found word is assigned and that is at the conceptual hierarchy level indicated by the reader attribute; and replacing the found word in the similar document with the replacement word; and acquiring output text by using a text generation model, the output text being answer text for the input text when the input text and the abstracted similar document have been input to the text generation model.

* * * * *